United States Patent [19]
Little

[11] Patent Number: 5,617,739
[45] Date of Patent: Apr. 8, 1997

[54] SELF-CLEANING LOW-TEMPERATURE REFRIGERATION SYSTEM

[75] Inventor: William A. Little, Palo Alto, Calif.

[73] Assignee: MMR Technologies, Inc., Mountain View, Calif.

[21] Appl. No.: 412,529

[22] Filed: Mar. 29, 1995

[51] Int. Cl.$^6$ ........................................................ F25J 3/00
[52] U.S. Cl. ................... 62/619; 62/85; 62/114; 62/475; 62/906
[58] Field of Search ................. 62/85, 475, 48.2, 62/619, 906, 114

[56] References Cited

U.S. PATENT DOCUMENTS

| | | |
|---|---|---|
| 3,266,262 | 8/1966 | Moragne ................................ 62/48.2 |
| 4,781,738 | 11/1988 | Fujiwara et al. ......................... 62/114 |
| 5,186,011 | 2/1993 | Yoshida et al. .......................... 62/114 |

*Primary Examiner*—Ronald C. Capossela
*Attorney, Agent, or Firm*—Lumen Intellectual Property Services

[57] ABSTRACT

A method and device is disclosed for removing residual oil and other contaminants from the refrigerant stream flowing to low-temperature stages of a cryogenic refrigerator. A stream of vapor and liquid refrigerant coming from an air-cooled condenser is injected into a cyclone chamber [32] through the inlet tube [34]. While the liquid drains down a conical section [36] and out through a liquid line [38], the vapor phase moves up into a packing of metal platelets [42] which is cooled by a returning stream of cold vapor passing through a tube [48] wrapped around the column. A portion of the vapor condenses on the platelets and is maintained in equilibrium with the vapor. Since high-molecular-weight contaminants are more soluble in the liquid phase, they are carried down the column with the drops of condensate and are swept out with the liquid fraction through the liquid line [38]. Consequently, the vapor sent out vapor line [46] and into the low-temperature stages of the refrigeration system is cleansed of all oil residues and contaminants. A low-temperature refrigeration system with such a device can be operated continuously for many weeks with no signs of clogging. Moreover, the fractionating column is inexpensive, contains no moving parts, and does not add significant volume to the system.

20 Claims, 2 Drawing Sheets

SELF-CLEANING LOW-TEMPERATURE REFRIGERATION SYSTEM

This invention was reduced to practice with Government support under the Department of Navy Contract N00014-94-C-2164, awarded by ARPA. The Government has certain rights in the invention.

FIELD OF THE INVENTION

This invention relates to closed-cycle, cryogenic refrigeration systems using multi-component mixed-gas refrigerants and oil-lubricated compressors. In particular, it relates to devices and methods for separating oil and other contaminants from the working fluids in such systems.

BACKGROUND OF THE INVENTION

Refrigeration systems for attaining temperatures down to about −40° C., such as those used in domestic refrigerators and freezers, operate on the vapor-compression cycle. In the first step of this cycle, a low-pressure refrigerant vapor is compressed by a simple oil-lubricated compressor, such as a rotary vane or piston compressor. The warm compressed vapor then enters an air-cooled condenser where it loses heat and condenses. The condensed liquid refrigerant, with some entrained oil dissolved in it, passes through a fine capillary tube, throttle, or restriction into a larger chamber at a lower pressure, where it evaporates and absorbs heat. The low-pressure refrigerant vapor and the oil are then returned to the intake of the compressor, closing the cycle.

Lower temperatures, down to the −50° C. to −100° C. range, can be achieved by cascading two vapor-compression cycle refrigeration systems. The first system refrigerates down to the −20° C. to −40° C. range as described above, while the second system refrigerates further down to the −50° C. to −100° C. range using a low-boiling-point refrigerant. In order to operate such is cascade refrigerators continuously, the concentration of oil in the low-boiling-point refrigerant must be kept low enough so that it remains dissolved in solution and does not clog the low-temperature capillary, blocking the refrigerant flow. Although it is possible to attain temperatures below −100° C. using these techniques, such cascaded refrigeration systems have clogging problems at these lower temperatures. Moreover, one must either use additional refrigeration circuits or higher pressure compressors, both of which add cost and complexity to the refrigerator.

Temperatures down into the −100° C. to −200° C. range also have been achieved using a single refrigerant stream with a mixture of several refrigerants having different boiling points. In this method of refrigeration, a simple compressor pressurizes the refrigerant mixture, some portion of which condenses when cooled to ambient temperature by an air-cooled condenser. The liquid portion is then separated from the vapor portion in a liquid-vapor separator and allowed to expand through a capillary, causing it to evaporate and cool. The evaporated liquid passes through a heat-exchanger where it cools the vapor coming from the separator, and then flows back to the compressor. Meanwhile, as the vapor coming from the separator is cooled in the heat-exchanger, a portion of it condenses. This condensed portion is then separated from the remaining vapor portion, evaporated, and used to cool the remaining vapor portion further, just as before. Several such stages of liquid-vapor separation and counter-current heat exchange are used to reach the lowest refrigeration temperature.

In this type of refrigeration system, oil from the compressor is largely concentrated in the liquid fraction of the first liquid-vapor separator and returned to the compressor via the first counter-current heat exchanger. Likewise, the higher-boiling-point components of the mixture are successively removed from the refrigerant stream as it proceeds through the stages to the lowest temperature stage, thus removing these components from the stream before they can freeze in the lower temperature capillaries and clog the system. This refrigeration method, however, does not provide an effective means for purging the refrigerant stream of all high-molecular-weight contaminants that can clog the flow at low temperatures. Moreover, the phase separators add cost and complexity to the refrigeration system.

The principles of these single-stream mixed-refrigerant systems were first described by A. P. Kleemenko, "One Flow Cascade Cycle", Proceedings of the Xth International Congress on Refrigeration, Copenhagen, 1, 34–39, (1959), Pergamon Press, London. They have subsequently been described in texts of cryogenic refrigeration systems, such as "Theory and Design of Cryogenic Systems" by A. Arkjarov, I. Marfenina and Ye. Mikulin, Mir Publishers, Moscow (1981). An important improvement in the cycle was described by D. J. Missimer in U.S. Pat. No. 3,768,273 issued in 1973. Missimer obtained more stable and lower pressure operation by making only a partial liquid-vapor separation at each stage rather than a complete separation. Nevertheless, Missimer's improvement on this type of refrigeration system still has low temperature clogging problems due to high-molecular-weight contaminants in the refrigerant stream, and still requires the use of several phase separators.

Other authors have described the use of mixed-gas refrigerants to attain low temperatures without the use of expensive phase separators. Most notable are those refrigerant mixtures containing a mixture of nitrogen with some of the lighter hydrocarbon gases, such as methane, ethane, propane, and iso-butane. Similar mixtures containing, in addition, some of the Freons have been described by Alfeev, Brodyansky, Yagodin, Nikolsky & Ivantsov, British Patent 1,336,892 (1973); W. A. Little, Proceedings of the 5th Cryocooler Conference, Monterey, (1988); W. A. Little, Advances in Cryogenic Engineering, 1305–1314 (1990); C. K. Chan, Proceedings of Interagency Cryocooler Meeting on Cryocoolers, p. 121 (1988), and R. Longsworth, U.S. Pat. No. 5,337,572 (1994).

As Chan and Little have noted, although refrigeration system using these refrigerant mixtures can attain low temperatures without using phase separators, experience has shown that prolonged refrigeration at these temperatures can only be achieved if the gas stream is cleansed of condensable contaminants. Present methods for cleaning the working fluid of oil residues, contaminants, and water vapor involve introducing filters (e.g., a molecular sieve or a series of activated charcoal adsorption filters) into the high-pressure line or pressure-swing dual-adsorption columns. These filters, however, are expensive and add complexity to the system. Moreover, they add substantially to the volume of the refrigeration system, resulting in refrigeration systems that are large, bulky, and have start-up problems.

Contaminants that can cause clogging of the capillaries or expansion valves are of two general classes. The first class of contaminants includes the residual oil that remains in the stream after it passes through the oil separator. This residual oil can precipitate out of the refrigerant solution at the lowest temperatures and cause clogging. The second class of contaminants includes the products from reactions between the oil and the refrigerants, as well as high-molecular-weight residues extracted over time from various sources in the compressor such as the wire insulation, the lubricant used for winding the wire, plastic insulation, castings, the oil, and the case of the compressor. Although a simple cyclone oil separator can remove much of the entrained oil from the hot vapor coming from the compressor, it is ineffective in removing the more complex residues in the second class of contaminants.

OBJECTS AND ADVANTAGES OF THE INVENTION

In view of the above, it is a primary object of the present invention to provide a simple and inexpensive refrigeration system that can be continuously operated at low temperatures without clogging. It is also an object of the invention to provide a means by which the working fluid of a mixed-refrigerant cryocooler can be continuously purged of both high and low molecular weight contaminants. It is a further object of the invention to provide such means which is simple, inexpensive, contains no moving parts and does not add significant volume to the refrigerating system. Further objects and advantages will become apparent from the following description and drawings.

SUMMARY OF THE INVENTION

The present invention includes a novel method of separating residual contaminants from a refrigerant stream. It is based upon the fact that the contaminants are generally more soluble in the liquid fraction than in the vapor fraction. In order for this fact to be effectively applied to separation, however, the liquid and vapor fractions must be kept in equilibrium with one another so that an effective partition between the two phases can occur. The present invention achieves this equilibrium by using a miniature fractionating column containing a packing which presents a large surface area to the vapor. This column is inserted in the high-pressure line from the compressor after the air-cooled condenser and is cooled by a returning flow of low-pressure vapor from the counter-current heat exchanger. As the vapor flows upward through the column, a condensate forms on these cooled platelets and washes down through the column. Consequently, the residual contaminants, which are more soluble in the liquid condensate than in the vapor, are separated from the vapor fraction, collected in the bottom of the column, and washed away. The details of this process will become clear from the cooling system described below.

DETAILED DESCRIPTION

Figure 1:
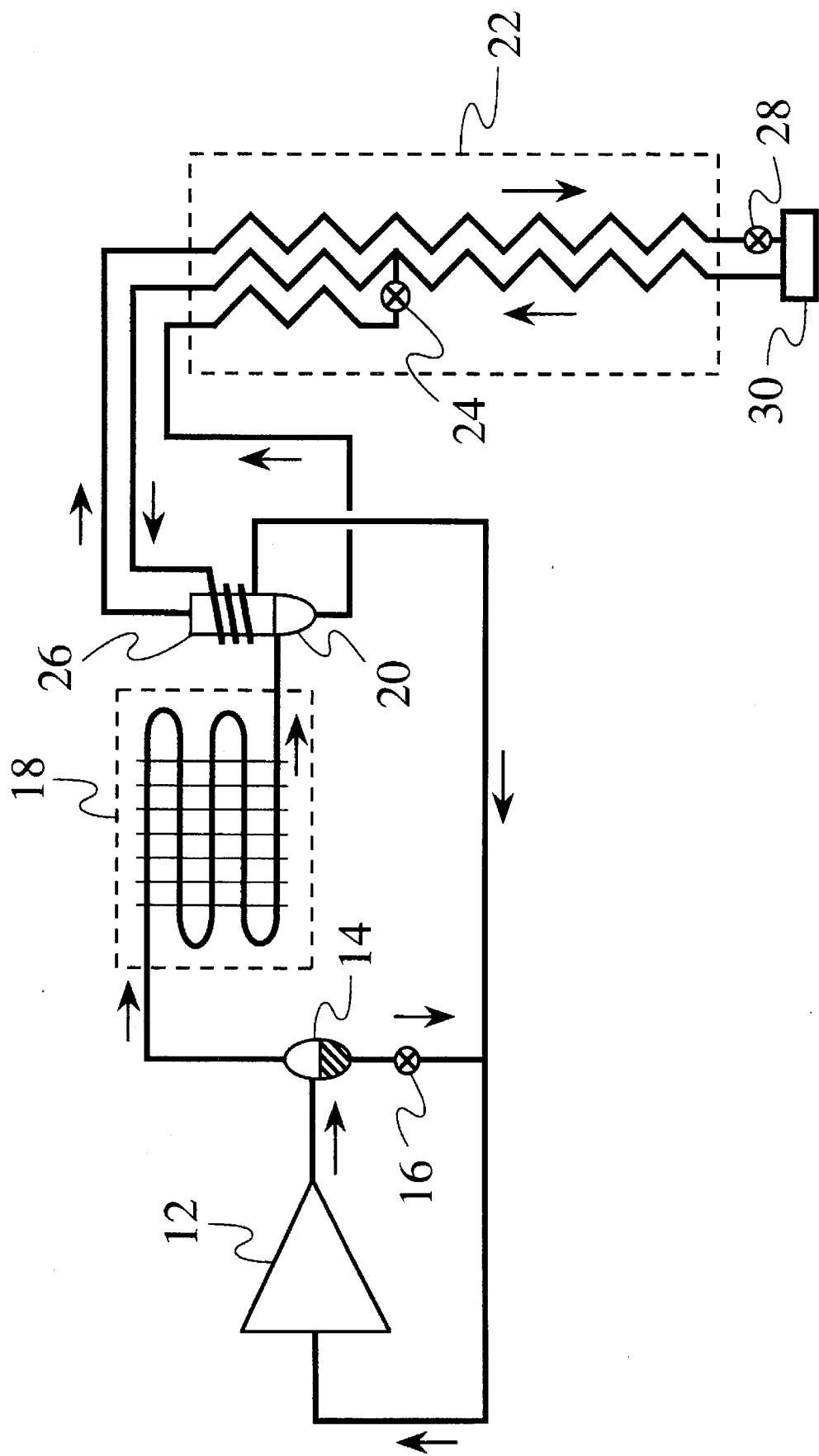
FIG. 1 is a schematic representation of a self-cleaning refrigeration system according to the invention.

A preferred embodiment of the invention is shown in FIG. 1. Circulating through the system is a refrigerant mixture composed of 8% propane, 8% n-butane, 12% argon, 7% nitrogen, 18.5% R14, 14.5% R134a, 17.5% R23, and 14.5% R123. Other refrigerant mixtures of different composition can also be used, such as the mixtures described by Missimer, Alfeev et al, Longsworth, Little and others. A simple oil-lubricated compressor 12 compresses a low-pressure returning stream of the mixture to a pressure of about 17 bar. This compressor can be, for example, a conventional piston or rotary vane compressor. The preferred embodiment uses a Danfoss FF8.5GX compressor with a displacement of 8 cc's, operating at 60 Hz (3600 rpm), drawing approximately 300 W input power, fully oil lubricated with a 400 cc's charge of Polyolester oil.

The refrigerant mixture emerges from the compressor 12 as a hot vapor with about 2% entrained oil from the compressor contained in it as fine droplets. The mixture then enters a cyclone oil separator 14, where the droplets are thrown against the wall of the separator, coalesce, and flow back to the compressor via a fine capillary 16. Meanwhile, the hot vapor, cleansed of most of the oil, leaves through the top of the separator 14. It then enters an air-cooled condenser 18 where a portion of the vapor liquefies. The liquid and vapor fractions of the resulting refrigerant stream are then separated in a cyclone liquid-vapor separator 20.

The liquid fraction of the refrigerant flows through the bottom of the separator and into the top of a counter-current heat exchanger 22 where it is pre-cooled by a stream of cold vapor returning from the low-temperature portion of the system. This pre-cooled liquid, which is at high pressure, then passes through an expansion capillary 24, causing it to evaporate and cool further. The evaporated liquid then joins the returning cold vapor stream part-way through the heat-exchanger 22. After this stream of cold vapor exits the top of the heat-exchanger 22, it flows through a tube coiled around and bonded to the outside of a fractionating column 26 where it cools the top half of the column. Finally, this cool vapor stream returns to the low-pressure side of the compressor where it repeats the cycle.

Meanwhile, the high-pressure vapor fraction of the refrigerant in the liquid-vapor separator 20 rises up through the cooled fractionating column 26 and flows into the heat-exchanger 22 where it progressively cools and condenses as it flows down the heat-exchanger. The high-pressure liquid then expands through a capillary 28, cooling further as it evaporates. Now at the lowest temperature stage, the resulting cold vapor stream absorbs heat from a cold plate 30 which is used, for example, to cool a load inside a thermally insulated container or dewar (not shown).

Figure 2:
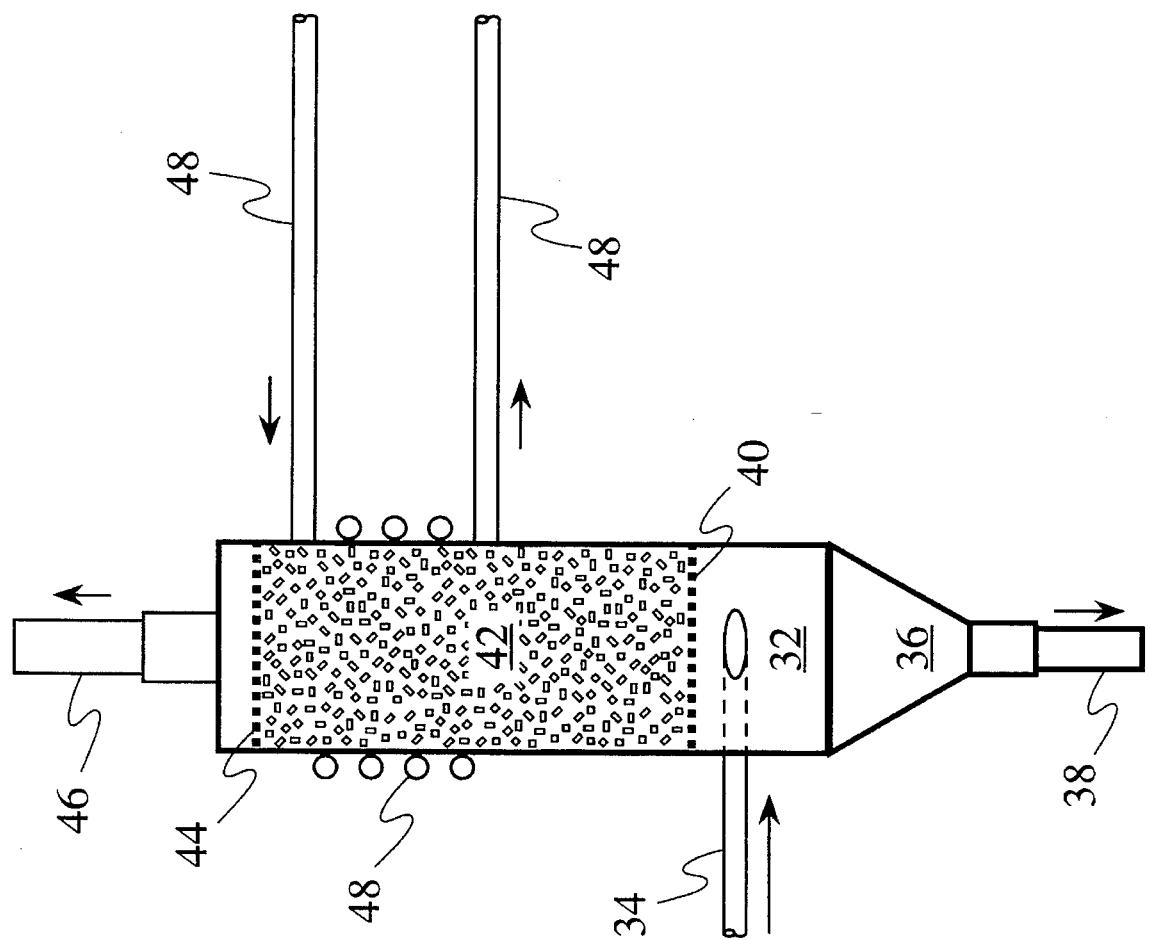
FIG. 2 is a cross-sectional view of a fractionating column and liquid-vapor separator according to the invention.

FIG. 2 shows a cross-sectional view of the fractionator 26 and liquid-vapor separator 20 shown in FIG. 1. A stream of vapor and liquid refrigerant is injected at high velocity into a cyclone chamber 32 through the inlet tube 34. A vortex forms in the center of the chamber, forcing the heavier liquid fraction to the outside and the lighter vapor phase closer to the core. The liquid contacts the wall and drains down a conical section 36 and out through a liquid line 38.

Meanwhile, the vapor phase moves upwards through a supporting wire screen 40 and into a packing of many small metal platelets 42. In a preferred embodiment, the packing used is "Pro-Pak protruded metal packing, 0.16" PMP, Type 316 Stainless Steel", available from Scientific Development Company, P.O. Box 795, Pennsylvania 16804. This packing is cooled by a stream of cold vapor passing through a tube 48 which is wrapped around and brazed to the outside of the column. As the vapor passes up through the cool packing, a portion of it condenses on the platelets and washes down and out the liquid line 38 at the bottom of the separator, taking with it any residual contaminants that may have been present in the vapor.

The composition of the refrigerant mixture is designed so that, at a fixed pressure, the vapor condenses to liquid over an extended temperature range (preferably ranging from the ambient temperature down to the operating temperature of the refrigerator). Consequently, as the vapor moves up through the progressively cooler packing, it continuously condenses on the metal platelets. This condensate wets the platelets and slowly drains down the column. Since the wetted platelets present a very large surface area to the ascending vapor stream, the exchange of molecules between the liquid and vapor can occur with great ease, thereby allowing equilibrium to be attained. Since high-molecular-weight contaminants are more soluble in the liquid phase of the refrigerant than in the vapor phase, they are carried down the column, drip out of the bottom of the packing with the condensate, collect in the liquid-vapor separator, and are swept out with the liquid fraction through the liquid line 38. Consequently, the vapor emerging from the top of the packing is cleansed of all oil residues and contaminants. This purified refrigerant vapor then rises up through an upper screen 44 and out a vapor line 46 to the lower temperature portions of the refrigeration system.

The dimensions of the column are chosen so that the vapor velocity through the packing is low enough to allow the condensed liquid to flow down the column against the flow of the vapor rather than up. The ratio of the height to the width of the column should lie between 3:1 and 10:1 to obtain the greatest separation efficiency with the least impedance to the flow of refrigerant. The preferred embodiment uses a column 4" in height and 1" in diameter.

A prototype of this system cooled down to 141 K. in 45 minutes and attained a refrigerant capacity of 30 W at 150 K. It ran continuously for 1000 hours (42 days) with no signs of clogging. This method of low-temperature refrigeration, therefore, provides a simple refrigeration system that can be continuously operated at low. temperatures without clogging. The fractionating columns purges the refrigerant mixture of both high and low molecular weight contaminants, contains no moving parts and does not add significant volume to the system.

Ramifications and Scope

Although the above description contains many specifics, it is intended merely as one illustration of how the disclosed method may be implemented. Many variations are possible in the composition of the refrigerant and in the materials and components used in the system. This method can also be used with refrigeration systems having different designs. For example, although the above system uses a single fractionating column at the warmer end of a single-stage cycle, it is obvious that additional fractionating columns can be included at lower temperature stages in a more complicated multi-stage cycle. These additional fractionating columns would be introduced where liquid-vapor separators of the conventional type would normally be used, as is described by Kleemenko and Missimer. These additional columns are needed for continuous operation at still lower temperatures, where one of the higher-boiling-point components of the mixture tends to precipitate out from solution and clog the system. In addition, as Missimer has pointed out, complete vapor-liquid separation is neither necessary nor beneficial. By allowing all the liquid contained in the separator to pass through the capillary restrictor 24 along with some additional vapor, no build-up of liquid can occur in the cyclone separator 20 nor flooding of the fractionator 26.

In addition to metal platelets, a variety of different packing materials can be used in the fractionator column, such as glass beads, glass spirals, porcelain pieces, or ceramic chips. Such materials are available from scientific supply houses for the packing of distillation columns. Although the refrigerant mixture used in the preferred embodiment has specific percentages of various components, these percentages may be varied by as much as 3% without altering the significant attributes of the mixture. In addition, this method may be used with other multi-component refrigerant mixtures having similar properties. In view of these and other possible variations, the scope of the invention should not be determined by the details of the above description, but by the following claims and their legal equivalents.

I claim:

1. A device for removing high-molecular-weight contaminants from a vapor fraction of a multi-component refrigerant mixture in a closed-cycle cryogenic refrigeration system having a predetermined operating temperature, the device comprising:

a packing material through which the vapor fraction flows upward;

a cooling means for cooling the packing material sufficiently below the temperature of the vapor fraction so that a condensate of the vapor fraction is created on the surface of the packing material, the surface of the packing material presenting to the vapor fraction an area sufficiently large so that equilibrium between the condensate and the vapor is maintained; and a collecting means for collecting a portion of the condensate that drips down through the packing material, whereby the high-molecular-weight contaminants are extracted from the vapor and washed out with the portion of the condensate that drips down through the packing material.

2. The device of claim 1 wherein the packing material comprises metal platelets supported by wire screens.

3. The device of claim 1 wherein the cooling means comprises a stream of cold refrigerant passing through a tube wrapped around the packing.

4. The device of claim 1 wherein the collecting means comprises a liquid-vapor separator and a liquid line for carrying a liquid fraction of the refrigerant.

5. The device of claim 1 wherein the refrigerant mixture is chosen so that the vapor fraction condenses, at a fixed pressure, over a temperature range extending from the temperature of the vapor fraction down to the predetermined operating temperature.

6. The device of claim 1 wherein the refrigerant mixture is comprised of 8% propane, 8% n-butane, 12% argon, 7% nitrogen, 18.5% R14, 14.5% R134a, 17.5% R23, and 14.5% R123.

7. A method for removing high-molecular-weight contaminants from a vapor fraction of a multi-component refrigerant mixture in a closed-cycle cryogenic refrigeration system having a predetermined operating temperature, the method comprising:

passing the vapor fraction upward through a packing material which presents a surface area to the vapor fraction;

cooling the packing material sufficiently below the temperature of the vapor fraction to create a condensate of the vapor fraction on the surface area of the packing material;

maintaining equilibrium between the condensate and the vapor; and collecting a portion of the condensate that drips down through the packing material, whereby the high-molecular-weight contaminants are extracted from the vapor and washed out with the portion of the condensate that drips down through the packing material.

8. The method of claim 7 wherein the packing material comprises metal platelets supported by wire screens.

9. The method of claim 7 wherein the cooling step comprises passing a stream of cold refrigerant through a tube wrapped around the packing.

10. The method of claim 7 wherein the refrigerant mixture condenses, at a fixed pressure, over a temperature range extending from the temperature of the vapor fraction down to the predetermined operating temperature.

11. The method of claim 7 wherein the refrigerant mixture is comprised of 8% propane, 8% n-butane, 12% argon, 7% nitrogen, 18.5% R14, 14.5% R134a, 17.5% R23, and 14.5% R123.

12. A method for extracting contaminants from a vapor fraction of a refrigerant mixture circulating in a closed-cycle refrigeration system, the method comprising:

condensing a portion of the vapor fraction to yield a condensates, wherein the portion of the vapor fraction contains a residual portion of the contaminants;

dissolving in the condensate the residual portion of the contaminants by maintaining phase-equilibrium between the vapor fraction and the condensate; and removing the condensate to yield a purified refrigerant vapor.

13. A method of closed-cycle low-temperature refrigeration comprising:

compressing a multi-component refrigerant in a compressor to form a hot refrigerant stream containing contaminants;

separating a vapor fraction of the stream from a liquid fraction of the stream;

condensing a portion of the vapor fraction to form a condensate;

placing the vapor fraction and the condensate in phase-equilibrium with each other;

dissolving into the condensate residual contaminants present in the vapor fraction while the vapor fraction and the condensate are in phase-equilibrium;

removing the condensate containing the residual contaminants from the vapor fraction to produce a purified vapor stream; and passing the purified vapor stream through low-temperature stages of a refrigeration cycle and thereafter back to the compressor.

14. The method of claim 13 wherein the step of placing the vapor fraction and the condensate in phase-equilibrium is performed by presenting a large surface area to the condensate and vapor.

15. The method of claim 13 wherein the removing step comprises allowing the condensate to drip down through a cooled packing material under the influence of gravity while the purified vapor stream rises up.

16. The method of claim 13 wherein the contaminants have a molecular weight significantly larger than a molecular weight of the refrigerant.

17. The method of claim 13 wherein the refrigerant comprises propane, n-butane, argon, nitrogen, R14, R134a, R23 and R123.

18. The method of claim 13 wherein the low-temperature stages of the refrigeration cycle reach temperatures below $-100°$ C.

19. The method of claim 13 wherein the condensing step is performed by passing the vapor fraction through a cooled packing material.

20. The method of claim 19 wherein the packing material comprises metal platelets.

* * * * *